UNITED STATES PATENT OFFICE 2,446,538

3-AMINO STEROIDS AND THEIR PREPARATION

Percy L. Julian, Maywood, John W. Cole, Chicago, Arthur Magnani, Wilmette, and Edwin W. Meyer, Chicago, Ill., assignors to The Glidden Company, Cleveland, Ohio, a corporation of Ohio No Drawing. Application August 5, 1944, Serial No. 548,318

7 Claims. (Cl. 260—397.5)

This invention relates to certain steroids possessing a primary or secondary amino-group in the 3-position of the steroid nucleus and to the preparation of these 3-amino-steroids by interaction of the appropriate amines with i-steroids.

In particular i-androstene-17-ol compounds of the general formula

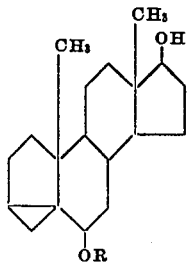

and prepared by reduction of the corresponding 17-keto compounds as described in our copending application Serial No. 547,306, filed July 29, 1944, react with certain amines to produce 3-amino derivatives of the general formula

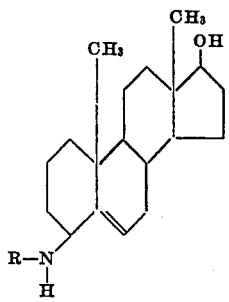

These 3-amino-derivatives are useful intermediates in the synthesis of physiologically active compounds. Specifically 3-amino-androstene-17-ol compounds of the general formula above may be converted into the male sex hormone, testosterone, by treatment with hypochlorous acid, followed by removal of the elements of HCl and subsequent hydrolysis, which is described in our copending application Serial No. 548,317, filed August 5, 1944.

An object of the present invention, therefore, is to produce certain new 3-amino-steroids.

A further object is to provide a novel process for preparing 3-amino-steroids.

Another object is to provide new intermediates suitable for the preparation of physiologically active substances.

Other objects will be apparent to those skilled in the art.

With the exception of cholesteryl aniline, (Lieb et al., Ann. 509, 214 (1934)) the 3-amino-steroids have not been prepared in anything but meager yields by employment of the classical methods for securing primary and secondary amines. After disappointing experiences in our attempts to obtain 3-amino-derivatives of the androstene series by classical methods, we found that these derivatives could be prepared in excellent yield by treatment of certain i-androstene compounds with the appropriate amine. Thus the hitherto unknown 3-amino-derivatives of the androstene series have been obtained for the first time.

These 3-amino-steroids open up entirely new possibilities for the synthesis of sex hormones, many of which contain a keto-group in the 3-position of the sterol nucleus. All methods hitherto described for introducing this keto-group into the 3-position of the sterol nucleus depend upon the conversion of a 3-hydroxy-group into a 3-keto group. Such a conversion is fraught with complications when a second hydroxy group is present in the steroid nucleus or when unsaturation exists. As shown in our copending application Serial No. 548,317, filed August 5, 1944, the 3-amino-steroids obviate these complications.

Specifically the 3-amino-androstene-17-ol has led us to a new method of synthesis of the male sex hormone, testosterone. Moreover, since the body is known to convert certain amino-compounds into keto-compounds, we expect that these 3-amino-steroids will assume physiological importance.

The following examples will serve to illustrate the invention:

Example I

A solution of 3.0 g. of 6-methoxy-i-androstene-17-ol in 20 ml. of benzylamine containing 5.0 g. benzylammonium p-toluenesulfonate was refluxed for sixteen hours. The solution was diluted with ether and the precipitated benzyl-ammonium p-toluenesulfonate was separated. After removal of ether from the filtrate, the residue was steam distilled. There remained a tan, solid residue which was taken up in ether and washed with water. Upon shaking the ethereal solution with 10% hydrochloric acid, a white insoluble hydrochloride formed. The hydrochloride was washed with ether and separated. The free amine liberated by the addition of dilute sodium hydroxide to an alcoholic solution of the hydrochloride, was taken up in ether. The ether solution was washed free of alkali with water and dried. The solid obtained from the ethereal solution was crystallized from ether-petroleum ether. The first crop, 1.4 g. of 3-benzylamino-5-androstene-17-ol, melted at 175–178°. A second crop of this material, 0.5 g., melted at 168–176° C.

*Example II*

A solution of 3.0 grams of 3-benzylamino-5-androstene-17-ol in 75 cc. of absolute alcohol was cooled to —5° C. With agitation there was slowly added a dry ethereal solution of hypochlorous acid containing 0.4 g. HOCl. There resulted a clear solution of the N-chloro-amine to which was added a solution of 5.0 grams sodium in 75 cc. absolute alcohol and the whole refluxed for one hour. Upon heating the solution readily turned milky and a white precipitate of sodium chloride deposited. After removal of the alcohol by steam distillation a crystalline residue remained which after cooling was dissolved in ether. The ether solution was washed with water to remove the alkali. Then the ether was removed by concentration with the residue crystallized from 15 cc. of methyl alcohol. There was obtained 2.7 grams of the benzal derivative of 3-amino-5-androstene-17-ol representing a yield of 90%. Upon recrystallization from alcohol it melted at 225–227° C. The free 3-amino-5-androstene-17-ol was obtained from the benzal derivative by dissolving it in alcoholic HCl solution, warming and then steam distilling to remove the benzaldehyde formed. The resulting hydrochloride of the amine was hydrolyzed by the addition of NaOH and the free amine dissolved in ether. The ethereal solution of the amine was washed with water and concentrated to crystallization. The 3-amino-5-androstene-17-ol melted at 152–154° C.

When using other primary amines of the formula RCH₂NH₂ in which R is an organic radical, for treatment of the i-androstene compound, the resulting secondary amine may readily be converted to 3-amino-androstene by this same degradation employing hypochlorous acid, followed by removal of the elements of HCl and hydrolysis.

*Example III*

A mixture of 5 cc. aniline and 0.21 g. of i-dehydroandrosterone methyl ether was refluxed for one hour from a metal bath at 185° C., then cooled and steam distilled to remove excess aniline. The residue was dissolved in ether and the product precipitated by shaking with 5% hydrochloric acid for ten minutes. After washing with water and ether, the insoluble hydrochloride was shaken with ether and 10% sodium hydroxide. Evaporation of the ether solution gave a residue which crystallized from methanol, yielding 0.18 g. of 3-anilino-androstene-17-ol melting at 204–205° C.

*Example IV*

To a solution of 2.0 grams of 3-anilino-5-androstene-17-one melting at 204–206° C. in 60 cc. normal propyl alcohol heated on the steam bath was added in portions 5.0 grams sodium over a period of one hour. After all the sodium had dissolved there was added 100 cc. water and 15 cc. conc. HCl. The alcohol was removed by steam distillation and the residue after cooling was dissolved in ether. The ether solution was washed with water to remove the alkali and then concentrated. The residue was crystallized from ethyl alcohol. There was obtained 1.4 grams of 3-anilino-5-androstene-17-ol melting at 194–195° C. and a second crop of 0.2 gram melting at 189–192° C. A mixed melting point with the original 3-anilino-5-androstene-17-one melted at 172–175° C.

In exactly the same manner 3-phenetidino-androstene-17-one melting at 190–191° C. was reduced to 3-phenetidino-androstene-17-ol which melted at 160° C.

*Example V*

The 6-methoxy-i-androstene-17-ol of Examples I and II may be prepared by the method of Butenandt and Grosse, Ber. 69 B 2776–8 (1936). While these authors assumed an epi-configuration for their product, it has been shown by later workers that the i-structure shown herein is the proper one, see Wallis, Fernholz & Gebhart, JHCS 59, 137 (1937); Ford and Wallis, ibid. 1415; Ford, Chakravorty and Wallis, ibid. 60 413 (1938); Ladenberg, Chakravorty and Wallis, ibid. 61 3483 (1939); and Beynon, Heilbron and Spring, Journal Chemical Society 1459–61 (1937). It is to be noted that Beynon, Heilbron and Spring used the same procedure as Butenandt and Grosse. The i-cholesteryl methyl ether may, of course, be prepared according to Beynon et al.

A solution of 3.0 g. of i-cholesteryl methyl ether and 3.0 g. of benzylammonium p-toluenesulfonate in 20 ml. of benzylamine was refluxed for twenty-two hours. The solution was poured into water and extracted with ether. An insoluble hydrochloride separated upon shaking the ethereal solution with 10% hydrochloric acid. The hydrochloride was washed several times with dilute hydrochloric acid in order to remove excess benzylamine. After decomposition of the hydrochloride in ethanol with dilute sodium hydroxide solution, the free base was extracted with ether. The ether solution was washed with water and dried. The yellow, solid residue remaining after removal of solvent gave upon crystallization from acetone 1.5 g. of benzylcholesterylamine, white prisms melting at 115–118° C.

*Example VI*

A solution of 0.6 g. of i-cholesteryl methyl ether in 5 cc. aniline was refluxed from an oil bath at 190° C. for two hours, then cooled and diluted with 10 cc. of methanol. The dark solution rapidly crystallized. Filtering, washing with methanol and drying gave 0.6 g. of nearly colorless flakes of cholesterylaniline melting at 190° C.

*Example VII*

7.5 g. of benzyl-i-cholesterylamine and 5.0 g. of benzylammonium p-toluene-sulfonate in 20 ml. of benzylamine was refluxed for twenty-three hours. The golden-yellow solution was poured into ether and the benzylammonium p-toluenesulfonate separated. The ether filtrate was concentrated and steam distilled. An ether solution of the residue when shaken with 10% hydrochloric acid gave an insoluble hydrochloride. The hydrochloride was separated by centrifugation and washed three times with ether. A solution of the hydrochloride in ethanol was decomposed with 10% sodium hydroxide solution and the liberated base was extracted with ether. The residue, obtained from the washed and dried ether solution, was crystallized from acetone. There resulted 3.4 g. of benzylcholesterylamine melting at 115–117° C.

Other i-androstene compounds which may be treated with primary amines are i-compounds, having the primary amino group in the 6-position, those having the OH group in the 6-position and esters of the 6-hydroxy-i-compounds. Thus the i-compounds suitable for conversion to the 3-amino compounds may be said to possess the general formula

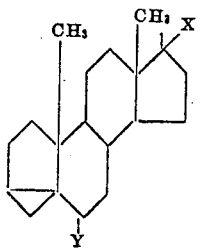

in which X is selected from the class consisting of =O,

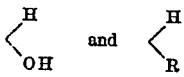

in which R is a hydrocarbon radical, and Y is a group selected from the class consisting of an amino group containing at least one hydrogen atom attached to the nitrogen atom and a group containing an oxygen atom attached to the steroid nucleus by a single bond.

Having described the invention, what we claim is:

1. The 3-secondary-amino-5-androstene-17-ols.
2. 3-amino-5-androstene-17-ol of the formula

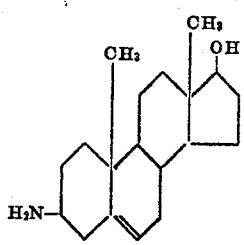

3. 3-benzylamino-5-androstene-17-ol.
4. 3-anilino-5-androstene-17-ol.
5. The process for preparing 3-amino-5-androstene-17-ol which comprises reacting a 6-alkoxy-i-androstene-17-ol with a primary amine of the formula $RCH_2NH_2$ in which R is an aryl radical in the presence of benzyl ammonium paratoluene sulfonate as a catalyst, and degrading the resulting steroid amine to the primary amine.
6. The process of preparing 3-anilino-5-androstene-17-ol, which comprises treating a 6-alkoxy-i-androstene-17-ol with aniline in the presence of benzyl ammonium paratoluene sulfonate as a catalyst.
7. The process for preparing 3-amino-steroids which comprises treating i-steroids of the general formula

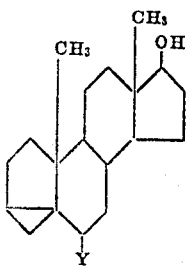

where Y is an alkoxy radical, with a primary amine in the presence of benzyl ammonium paratoluene sulfonate as a catalyst.

PERCY L. JULIAN.
JOHN W. COLE.
ARTHUR MAGNANI.
EDWIN W. MEYER.

REFERENCES CITED

The following references are of record in the file of this patent:

Lieb, Annalen, vol. 509, page 214 (1934).